United States Patent
Chen et al.

(10) Patent No.: US 10,245,730 B2
(45) Date of Patent: Apr. 2, 2019

(54) AUTONOMOUS MOBILE ROBOT AND CONTROL METHOD THEREOF

(71) Applicant: ASUSTeK COMPUTER INC., Taipei (TW)

(72) Inventors: Hsin-Fu Chen, Taipei (TW); Chao-Ching Fang, Taipei (TW); Chi-Hwa Ho, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 40 days.

(21) Appl. No.: 15/594,663

(22) Filed: May 15, 2017

(65) Prior Publication Data

US 2017/0344016 A1 Nov. 30, 2017

Related U.S. Application Data

(60) Provisional application No. 62/340,540, filed on May 24, 2016.

(30) Foreign Application Priority Data

Apr. 19, 2017 (CN) .......................... 2017 1 0256502

(51) Int. Cl.
*B25J 9/16* (2006.01)
*G05D 1/02* (2006.01)

(52) U.S. Cl.
CPC ........... *B25J 9/1694* (2013.01); *B25J 9/1697* (2013.01); *G05D 1/024* (2013.01); *G05D 1/0214* (2013.01);
(Continued)

(58) Field of Classification Search
CPC .............. G05D 1/0214; G05D 1/0238; G05D 2201/0203; G05D 2201/0215;
(Continued)

(56) References Cited

U.S. PATENT DOCUMENTS 6,324,462 B1 * 11/2001 Kageyama ........... G05D 1/0223
180/167
7,155,308 B2 * 12/2006 Jones ................... G05D 1/0238
700/245

(Continued)

FOREIGN PATENT DOCUMENTS

CN 104678998 A 6/2015
CN 104750105 A 7/2015
(Continued)

*Primary Examiner* — Behrang Badii
*Assistant Examiner* — David A Testardi
(74) *Attorney, Agent, or Firm* — CKC & Partners Co., LLC

(57) ABSTRACT

An autonomous mobile robot, adapted to move on a surface according to a moving datum plane, is provided. The autonomous mobile robot comprising: a first distance sensor configured to detect a first detecting distance between the first distance sensor and the surface along a first axial direction; a second distance sensor configured to detect a second detecting distance between the second distance sensor to the surface along a second axial direction; and a control unit configured to control the autonomous mobile robot to move in a speed limited mode when the first detecting distance is within a first distance range, and configured to control the autonomous mobile robot to stop moving when the second detecting distance is larger than a second pre-determined distance. A mobile control method is also provided.

11 Claims, 7 Drawing Sheets

(52) U.S. Cl.
CPC ... *G05D 1/0238* (2013.01); *G05D 2201/0216* (2013.01)

(58) Field of Classification Search
CPC ..... G05D 1/024; G05D 1/0255; B25J 9/0003; B25J 9/1694; B25J 9/1697; B25J 11/0085; A47L 9/009; A47L 2201/04
See application file for complete search history.

(56) References Cited

U.S. PATENT DOCUMENTS

| | | | |
|---|---|---|---|
| 8,275,506 B1 * | 9/2012 | Bishel | A01D 34/008 701/25 |
| 2005/0165508 A1 * | 7/2005 | Kanda | G05D 1/0251 700/245 |
| 2005/0171638 A1 * | 8/2005 | Uehigashi | G05D 1/0238 700/245 |
| 2005/0237388 A1 * | 10/2005 | Tani | G08B 13/19695 348/143 |
| 2007/0265740 A1 | 11/2007 | Yu et al. | |
| 2009/0157225 A1 * | 6/2009 | Jung | G01B 11/24 700/250 |
| 2010/0292884 A1 * | 11/2010 | Neumann | G05D 1/0225 701/25 |
| 2012/0035797 A1 * | 2/2012 | Oobayashi | G05D 1/0214 701/23 |
| 2012/0083982 A1 * | 4/2012 | Bonefas | G05D 1/0223 701/70 |
| 2012/0185096 A1 * | 7/2012 | Rosenstein | B25J 11/009 700/259 |
| 2012/0310466 A1 * | 12/2012 | Fairfield | G05D 1/024 701/28 |
| 2014/0088761 A1 * | 3/2014 | Shamlian | G05D 1/0238 700/253 |
| 2015/0151741 A1 * | 6/2015 | Taira | G05D 1/0242 701/23 |
| 2015/0151765 A1 * | 6/2015 | Taira | B60W 40/06 701/22 |
| 2015/0234384 A1 * | 8/2015 | Taira | G05D 1/0255 701/23 |
| 2015/0362921 A1 * | 12/2015 | Hanaoka | G01B 11/24 701/23 |
| 2017/0023943 A1 * | 1/2017 | Taira | G05D 1/0212 |
| 2017/0060132 A1 * | 3/2017 | Chung | G05D 1/024 |
| 2017/0176990 A1 * | 6/2017 | Keller | G01S 17/42 |

FOREIGN PATENT DOCUMENTS

| | | | | |
|---|---|---|---|---|
| DE | 10155488 A1 | * | 5/2003 | ........... G01B 11/026 |
| DE | 102013001119 A1 | * | 7/2014 | |
| JP | 07229724 A | * | 8/1995 | |
| JP | 08313250 A | * | 11/1996 | |
| JP | 09026823 A | * | 1/1997 | |
| JP | 09062354 A | * | 3/1997 | |
| JP | 2002323925 A | * | 11/2002 | |
| JP | 2003116758 A | * | 4/2003 | |
| JP | 2006260105 A | * | 9/2006 | |
| JP | 2008009927 A | * | 1/2008 | |
| JP | 2010134656 A | * | 6/2010 | |
| TW | 200742954 A | | 11/2007 | |
| TW | 201321239 A | | 6/2013 | |
| WO | WO-2014/064990 A1 | * | 5/2014 | |

* cited by examiner

AUTONOMOUS MOBILE ROBOT AND CONTROL METHOD THEREOF

CROSS-REFERENCE TO RELATED APPLICATION

This application claims the priority benefit of U.S. provisional application Ser. No. 62/340,540, filed on May 24, 2016, and China Application Number 201710256502.4, filed on Apr. 19, 2017, which are hereby incorporated by references herein and made a part of specification.

BACKGROUND OF THE INVENTION

Field of the Invention

The disclosure relates to an autonomous mobile robot.

Description of the Related Art

Generally, an autonomous mobile robot moves according to a preset mode in a particular working area. However, the autonomous mobile robot easily gets stuck due to a level difference, or falls off from high positions when the around condition is not detected in time in moving. As a result, the autonomous mobile robot is easily damaged and cannot work.

BRIEF SUMMARY OF THE INVENTION

According to an aspect of the disclosure, an autonomous mobile robot, adapted to move on a surface according to a moving datum plane, is provided. The autonomous mobile robot comprising: a first distance sensor configured to detect a first detecting distance between the first distance sensor and the surface along a first axial direction; a second distance sensor configured to detect a second detecting distance between the second distance sensor to the surface along a second axial direction; and a control unit configured to control the autonomous mobile robot to move in a speed limited mode when the first detecting distance is within a first distance range and configured to control the autonomous mobile robot to stop moving when the second detecting distance is larger than a second pre-determined distance. The first distance sensor has a first projection on the moving datum plane along the first axial direction. The second distance sensor has a second projection on the moving datum plane along the second axial direction. A distance between the first projection and the autonomous mobile robot is larger than the distance between the second projection and the autonomous mobile robot.

According to another aspect of the disclosure, a mobile control method, adapted to an autonomous mobile robot that moves on a surface according to a moving datum plane, is provided. The mobile control method comprising: obtaining a first detecting distance between a first position on the autonomous mobile robot and the surface along a first axial direction; obtaining a second detecting distance between a second position on the autonomous mobile robot and the surface along a second axial direction; controlling the autonomous mobile robot to move in a speed limited mode when the first detecting distance is within a first distance range; and controlling the autonomous mobile robot to stop moving when the second detecting distance is larger than a second pre-determined distance. The moving datum plane and the first axial direction have a first intersection. The moving datum plane and the second axial direction have a second intersection. A distance between the first intersection and the autonomous mobile robot is larger than the distance between the second intersection and the autonomous mobile robot.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1A:
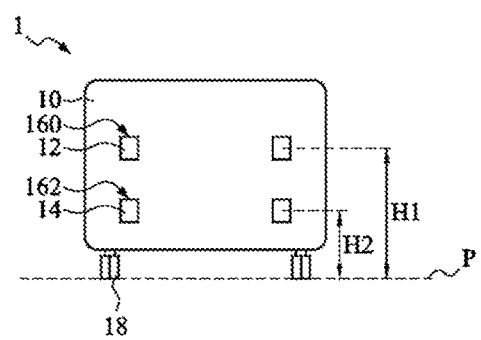
FIG. 1A and FIG. 1B are side views of an autonomous mobile robot in different directions in an embodiment.
Figure 1B:
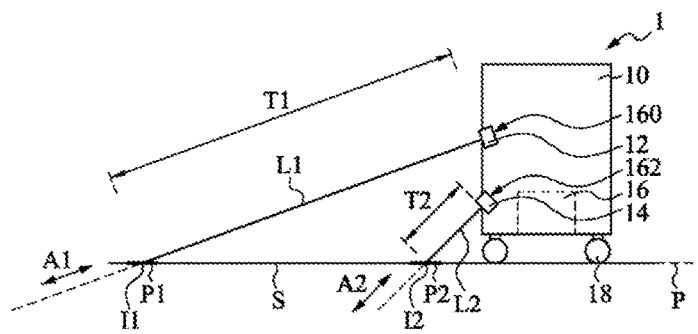

Please refer to FIG. 1A and FIG. 1B. FIG. 1A and FIG. 1B are side views of an autonomous mobile robot in different directions in an embodiment. In an embodiment, an autonomous mobile robot 1 is adapted to move on a surface S according to a moving datum plane P. As shown in FIG. 1A and FIG. 1B, in the embodiment, the autonomous mobile robot 1 includes a moving body 10, a first distance sensor 12, a second distance sensor 14, a control unit 16 and driving wheels 18. The moving datum plane P is defined by portions of the driving wheels 18 where are closest to the surface S. That is, the portions of the driving wheels 18 that are closest to the surface S are on the moving datum plane P. In an embodiment, the moving datum plane P is defined by any portion of the autonomous mobile robot 1 that is closest to the surface S.

In FIG. 1A and FIG. 1B, the first distance sensor 12 and the second distance sensor 14 are disposed at a first position 160 and a second position 162 on the moving body 10, respectively. In an embodiment, the first distance sensor 12 and the second distance sensor 14 are spaced apart from the surface S by a first height H1 and a second height H2, respectively. The first height H1 is different from the second height H2. The first distance sensor 12 is configured to detect a first detecting distance T1 between the first distance sensor 12 and the surface S along a first axial direction A1. The second distance sensor 14 is configured to detect the second detecting distance T2 between the second distance sensor 14 and the surface S along a second axial direction A2. The first axial direction A1 is not parallel to the second axial direction A2. In the embodiment, the first detecting distance T1 and the second detecting distance T2 are changed according to the distance between the reflection surface and the second distance sensor 14, and the distance between the first distance sensor 12 and the second distance sensor 14, respectively. In an embodiment, the first height H1 is equal to the second height H2. The first axial direction A1 is not parallel to the second axial direction A2. In an embodiment, the first height H1 is not equal to the second height H2. The first axial direction A1 is parallel to the second axial direction A2.

In FIG. 1A and FIG. 1B, the first distance sensor 12 emits first light L1 toward the surface S along the first axial direction A1. The second distance sensor 14 emits second light L2 toward the surface S along the second axial direction A2. The first distance sensor 12 has a first projection P1 on the moving datum plane P along the first axial direction A1. The second distance sensor 14 has a second projection P2 on the moving datum plane P along the second axial direction A2. A distance between the first projection P1 and the autonomous mobile robot 1 is larger than the distance between the second projection P2 and the autonomous mobile robot 1. The moving datum plane P and the first axial direction A1 have a first intersection I1. The moving datum plane P and the second axial direction A2 have a second intersection I2. A distance between the intersection I1 and the autonomous mobile robot 1 is larger than the distance between the second intersection I2 and the autonomous mobile robot 1. The moving body 10 of the autonomous mobile robot 1 is supported on the surface S via the driving wheels 18. The moving body 10 moves on the surface S via the driving wheels 18.

Figure 2A:
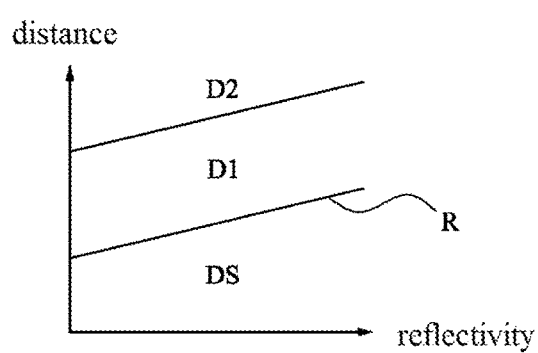
FIG. 2A is a diagram showing a relationship between reflectivities and detecting distances in an embodiment.

FIG. 2A is a diagram showing a relationship between reflectivities and detecting distances in an embodiment. In the embodiment, to make the autonomous mobile robot 1 adapted to the surfaces with different reflectivities, the reflectivities of the first light L1 from the first distance sensor 12 onto different surfaces are processed by an algorithm. Under a same circumstance, reflection information of the first light L1 emitted by the first distance sensor 12 onto the surfaces with different reflectivities is obtained, and reflection information of the first light L1 (which is emitted by the first distance sensor 12 onto the surface with the same reflectivity) based on different reflection distances is obtained. The actual distance (which is also called a first pre-determined distance in the embodiment), that is the distance between the first distance sensor 12 and the reflection surface along the first axial direction A1 is also calculated in comparison. Thus, a relationship between the first pre-determined distance of the first distance sensor 12 and the reflectivity, that is, the relationship R shown in FIG. 2A, is established. In the embodiment, the first pre-determined distance and the reflectivity are positively correlated. Therefore, after the control unit 16 of the autonomous mobile robot 1 receives data information detected by the first distance sensor 12, the material of the reflection surface can be determined. Then, the actual distance between the reflection surface and the first distance sensor 12 can also be determined.

In the embodiment, the error range is defined as 5% of the first pre-determined distance, which is not limited herein. Different distance ranges DS, D1 and D2 for the detecting distances corresponding to the reflectivity are defined according to the error ranges. As shown in FIG. 2A, for a particular reflectivity, when the detecting distance is less than a lower limit of the first distance range D1 and is within the safe distance range DS, which means the distance detected by the autonomous mobile robot 1 is equal to the first pre-determined distance. When the detecting distance is within the second range D2 (a lower limit of the second range D2 is greater than an upper limit of the first distance range D1), which means a level difference is detected by the autonomous mobile robot 1. When the detecting distance is within the first distance range D1, which means a level difference or a surface with a different reflectivity is detected by the autonomous mobile robot 1.

Figure 2B:
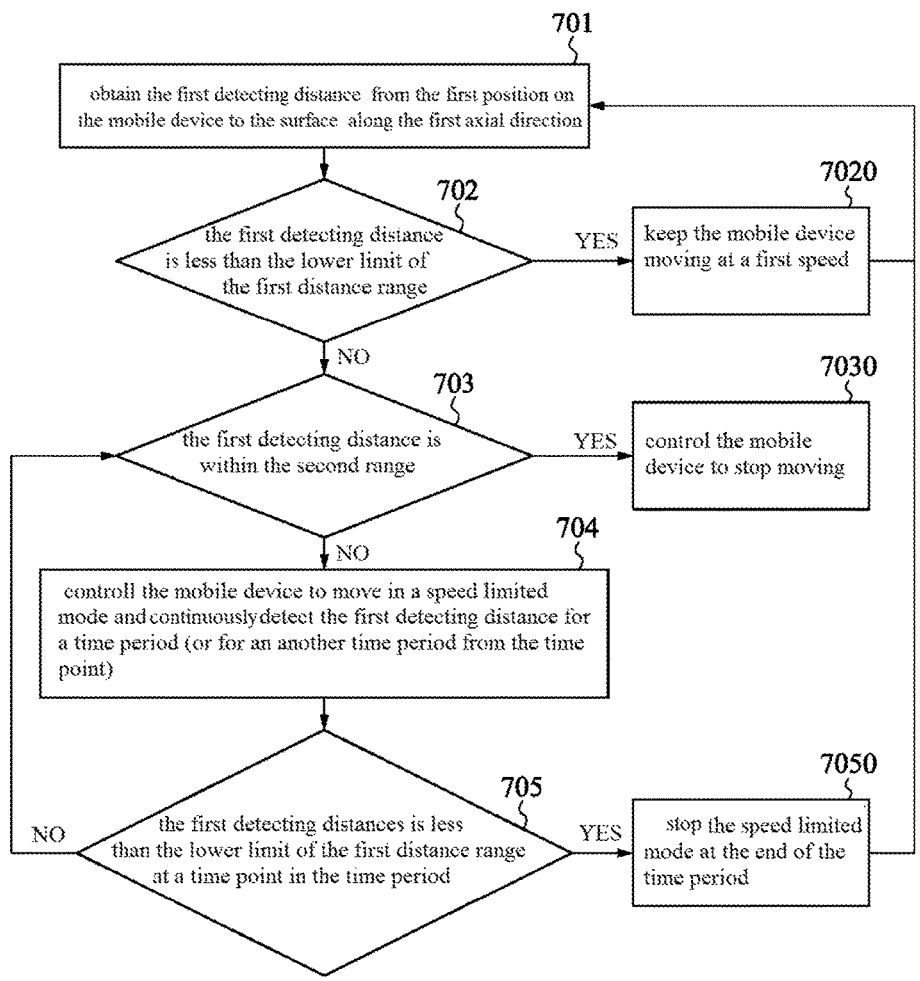
FIG. 2B and FIG. 2C are flow charts of a mobile control method in an embodiment.
Figure 2C:
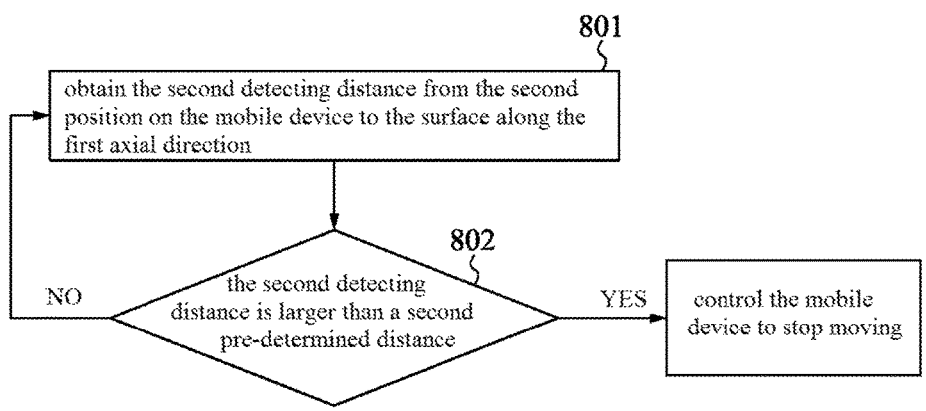

Please refer to FIG. 2B and FIG. 2C together with FIG. 1B and FIG. 2A. FIG. 2B and FIG. 2C are flow charts of a mobile control method in an embodiment. A mobile control method shown in FIG. 2B is illustrated based on the first distance sensor 12 of the autonomous mobile robot 1. A mobile control method shown in FIG. 2C is illustrated based on the second distance sensor 14 of the autonomous mobile robot 1. The sequence of steps of the mobile control method described hereinafter is not used to limit the invention. Unless specifically stated, some steps can be performed in a different sequence and/or simultaneously with other steps. Furthermore, one or more steps described herein can be combined or divided into more steps.

In an embodiment, as shown in FIG. 2B and FIG. 1B, the mobile control method based on the first distance sensor 12 of the autonomous mobile robot 1 includes steps 701 to 705.

In step 701, the first detecting distance T1 from the first distance sensor 12 (which is at the first position 160 on the autonomous mobile robot 1) to the surface S along the first axial direction A1 is obtained.

In step 702, whether to keep a movement speed (of the autonomous mobile robot 1) is determined. In step 702, the control unit 16 is configured to calculate to determine (whether to keep a movement speed of the autonomous mobile robot 1) and output an instruction. When the first detecting distance T1 is less than the lower limit of the first distance range D1 and is within the safe distance range DS, the autonomous mobile robot 1 is kept moving at a first speed in step 7020. Step 701 is performed again. When the first detecting distance T1 is not less than the lower limit of the first distance range D1, step 703 is performed.

Step 703 is to determine whether the movement (of the autonomous mobile robot 1) is stopped. In step 703, the control unit 16 is configured to do a calculation to determine whether to stop the movement of the autonomous mobile robot 1, and output an instruction. When the first detecting distance T1 is within the second range D2, the autonomous mobile robot 1 is controlled to stop moving, e.g. in step 7030. In an embodiment, when the first detecting distance T1 is within the second range D2, the autonomous mobile robot 1 is controlled to make a turn or backward. In an embodiment, when the first detecting distance T1 is not within the second range D2, but within the first distance range D1, step 704 is performed.

In step 704, the control unit 16 controls the autonomous mobile robot 1 to move in a speed limited mode and continuously detects the first detecting distance T1 for a time period. In the embodiment, the speed limited mode reduces the movement speed of the autonomous mobile robot 1 from the first speed to a second speed, or to keep the autonomous mobile robot 1 moves at the second speed, which is not limited herein. In an embodiment, the definition of the "time period" is at least longer than the time for that the autonomous mobile robot 1 moves from the intersection I1 to the second intersection I2 at the second speed (as shown in FIG. 1B), which is not limited herein.

In step 705, whether to stop the speed limited mode is determined. In step 705, the control unit 16 calculates to determine (whether to stop the speed limited mode) and outputs an instruction. When the first detecting distances T1 are less than the lower limit of the first distance range D1, but within the safe distance range DS during the time period, the speed limited mode is stopped at the end of the time period at step 7050. Step 701 is performed again. When the first detecting distance T1 is not less than the lower limit of the first distance range D1 during the time period, step 703 is performed again.

In an embodiment, as shown in FIG. 2C and FIG. 1B, a mobile control method based on the second distance sensor 14 of the autonomous mobile robot 1 includes steps 801 and step 802.

In step 801, the second detecting distance T2 from the second distance sensor 14 (which is at the second position 162 on the autonomous mobile robot 1) to the surface S along the first axial direction A2 is obtained.

In step 802, whether to stop the movement (of the autonomous mobile robot 1) is determined. In step 802, the control unit 16 calculates to determine (whether to stop the movement of the autonomous mobile robot 1) and outputs an instruction. When the second detecting distance T2 is larger than a second pre-determined distance (the actual distance between the second distance sensor 14 and the reflection surface along the second axial direction A2), the control unit 16 controls the autonomous mobile robot 1 to stop moving. In an embodiment, when the second detecting distance T2 is larger than the second pre-determined distance, the autonomous mobile robot 1 is controlled to turn or retreat. In an embodiment, when the second detecting distance T2 is less than the second pre-determined distance, step 801 is performed again.

As shown in FIG. 1B, in the embodiment, the first distance sensor 12 emits the first light L1 toward the surface S along the first axial direction A1. The first distance sensor 12 detects the first detecting distance T1 between the first distance sensor 12 and the surface S along the first axial direction A1. At the time, the first detecting distance T1 is less than the lower limit of the first distance range D1 (as shown in FIG. 2A), the control unit 16 controls the autonomous mobile robot 1 to keep moving at the first speed.

As shown in FIG. 1B, the second distance sensor 14 detects the second detecting distance T2 between the second distance sensor 14 and the surface S along the second axial direction A2. At the time, the second detecting distance T2 is equal to the second pre-determined distance. The control unit 16 would not control the autonomous mobile robot 1 to stop moving.

Figure 3A:
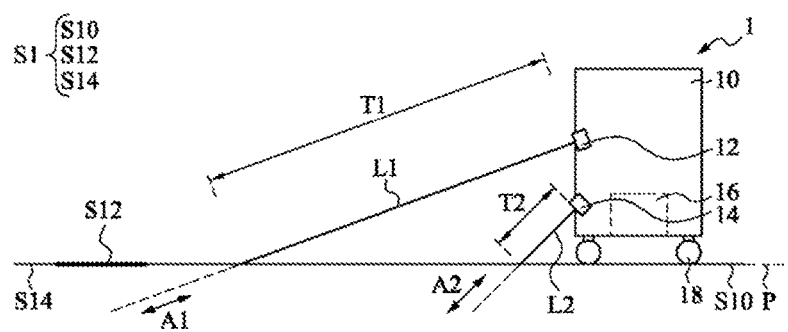
FIG. 3A and FIG. 3B are side views of an autonomous mobile robot on a surface at different time points in an embodiment.
Figure 3B:
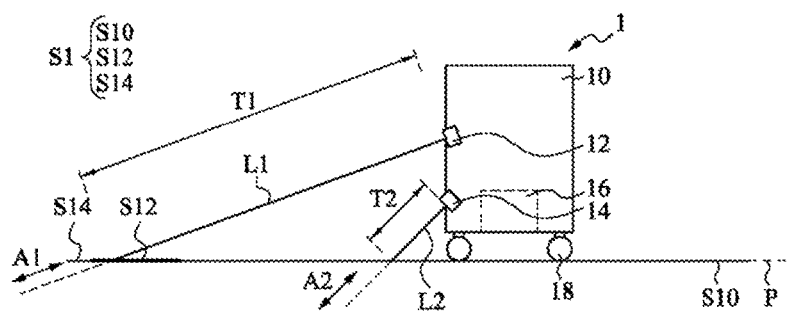

Please refer to FIG. 3A and FIG. 3B. FIG. 3A and FIG. 3B are side views of a autonomous mobile robot 1 on a surface S1 at different time points in an embodiment. A surface S1 includes a surface S10, a surface S12 and a surface S14. The surface S10, the surface S12 and the surface S14 locate at the moving datum plane P. The surface S12 locates between the surface S10 and the surface S14. The reflectivities of the surface S10 and the surface S14 are higher than the reflectivity of the surface S12. That is, the surfaces S10 and S14 are made of materials with higher reflectivities. The surface S12 is made of materials with a lower reflectivity. As shown in FIG. 3A, in the embodiment, the first distance sensor 12 and the second distance sensor 14 emit the first light L1 and the second light L2 toward the surface S10 along the first axial direction A1 and the second axial direction A2, respectively. The first distance sensor 12 detects the first detecting distance T1 between the first distance sensor 12 and the surface S10 along the first axial direction A1. At the time, the first detecting distance T1 is less than the lower limit of the first distance range D1. The control unit 16 controls the autonomous mobile robot 1 to keep moving at the first speed.

As shown in FIG. 3B, the first distance sensor 12 emits the first light L1 toward the surface S12 along the first axial direction A1. Since the surface S12 has a lower reflectivity, the first detecting distance T1 is within the first distance range D1. At the time, the control unit 16 controls the autonomous mobile robot 1 to move in the speed limited mode. That is, the control unit 16 reduces the movement speed of the autonomous mobile robot 1 from the first speed to the second speed, controls that the autonomous mobile robot 1 keeps moving at the second speed for a time period. The first detecting distance T1 is continuously detected.

Then, the first distance sensor 12 continues to emit the first light L1 toward the surface S12 along the first axial direction A1. At the time point when the first light L1 reaches the surface S12, the first detecting distance T1 is within the first distance range D1. The control unit 16 resets a time counter, controls the autonomous mobile robot 1 to move at the second speed for another time period subsequent to the time point, and continues to detect the first detecting distance T1.

Then, when the first light L1 emitted from the first distance sensor 12 reaches the surface S14 from the surface S12, since the surface S14 has a higher reflectivity, the first detecting distance T1 is less than the lower limit of the first distance range D1. Therefore, the control unit 16 stops the speed limited mode at the end of the another time period. That is, the control unit 16 is configured to raise the movement speed of the autonomous mobile robot 1 from the second speed to the first speed.

In the embodiment, the second distance sensor 14 detects the second detecting distance T2 between the second distance sensor 14 and the surface S2 along the second axial direction A2. At the time, the second detecting distance T2 is equal to the second pre-determined distance. The control unit 16 would not control the autonomous mobile robot 1 to stop moving.

Figure 4A:
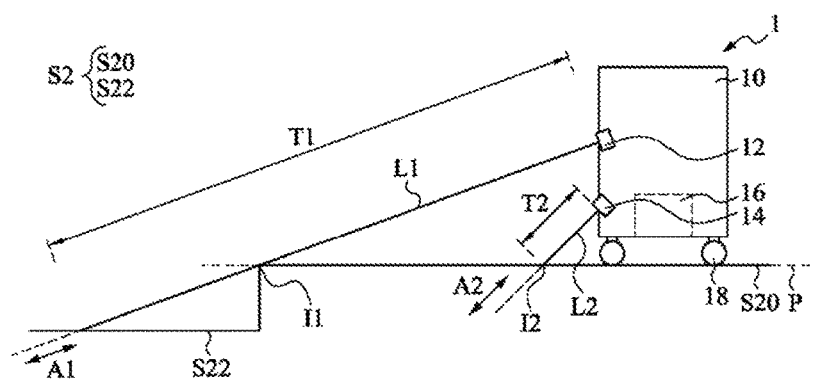
FIG. 4A and FIG. 4B are side views of an autonomous mobile robot on a surface at different time points in an embodiment.
Figure 4B:
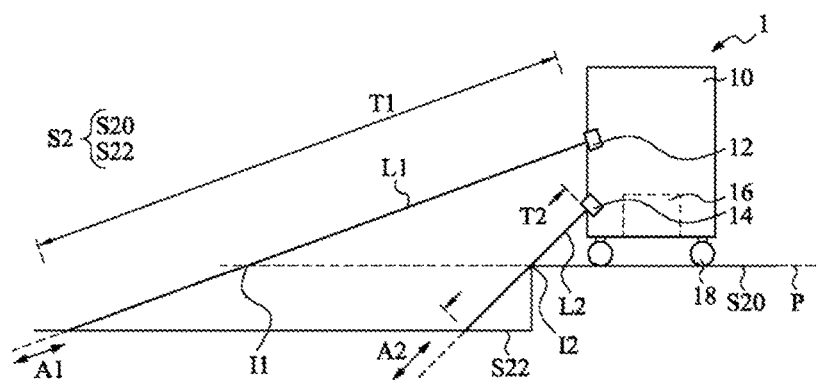

Please refer to FIG. 4A and FIG. 4B. FIG. 4A and FIG. 4B are side views of an autonomous mobile robot 1 on a surface S2 at different time points in an embodiment. A surface S2 includes surfaces S20 and S22. The surface S20 locates at the moving datum plane P. The surface S22 is located at a side of the moving datum plane P relative to the autonomous mobile robot 1. As shown in FIG. 4A, in the embodiment, the first distance sensor 12 and the second distance sensor 14 emit the first light L1 and the second light L2 toward the surface S2 along the first axial direction A1 and the second axial direction A2, respectively. When the first light L1 from the first distance sensor 12 reaches the surface S22, since the surface S22 is away from the intersection I1 between the moving datum plane P and the first axial direction A1, the first detecting distance T1 is within the first distance range D1. At the time, the control unit 16 controls the autonomous mobile robot 1 to move in the speed limited mode. That is, the control unit 16 is configured to reduce the movement speed of the autonomous mobile robot 1 from the first speed to the second speed, controls the autonomous mobile robot 1 to keep moving at the second speed for a time period and to continuously detect the first detecting distance T1.

Then, the first distance sensor 12 continues to emit the first light L1 toward the surface S22 along the first axial direction A1. At the time point when the first light L1 reaches the surface S22, the first detecting distance T1 is within the first distance range D1. The control unit 16 resets the time counter, controls the autonomous mobile robot 1 to move at the second speed for another time period subsequent to the time point and to continuously detect the first detecting distance T1.

In FIG. 4B, when the second light L2 from the second distance sensor 14 leaves the surface S20 and reaches the surface S22, since the surface S22 is away from the second intersection I2 between the moving datum plane P and the second axial direction A2, the second detecting distance T2 is larger than the second pre-determined distance. Therefore, the control unit 16 controls the autonomous mobile robot 1 to stop moving in the condition that the autonomous mobile robot 1 moves at the second speed in this condition. In an embodiment, the control unit 16 controls the autonomous mobile robot 1 to turn or retreat. In an embodiment, the second speed refers to that the autonomous mobile robot 1 would not fall down when the autonomous mobile robot 1 in moving becomes to stop from the second speed, which is not limited herein.

In an embodiment, the surface S22 is far away from the moving datum plane P. When the first light L1 from the first distance sensor 12 reaches the surface S22, the first detecting distance T1 is within the second range D2 (the lower limit of the second range D2 is greater than the upper limit of the first distance range D1). Therefore, the control unit 16 decelerates the autonomous mobile robot 1 to stop moving. In an embodiment, the control unit 16 controls the autonomous mobile robot 1 to turn or retreat.

Thus, when the first distance sensor 12 detects the level difference, the control unit 16 controls the autonomous mobile robot 1 to move at a lower speed. When the second distance sensor 14 detects the level difference, the autonomous mobile robot 1 stops moving. In such a way, the movement distance of the autonomous mobile robot 1 is increased, and the mobility of the autonomous mobile robot 1 is improved. Moreover, when the autonomous mobile robot 1 stops moving when the second distance sensor 14 detects the level difference, the autonomous mobile robot 1 would not fall down due to the movement inertia. The autonomous mobile robot 1 also would not fall off from high or get stuck at the level difference due to no enough time for decelerating.

Figure 5A:
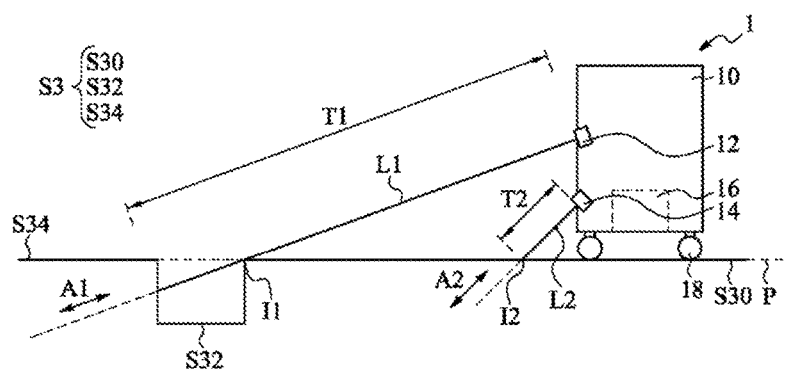
FIG. 5A and FIG. 5B are side views of an autonomous mobile robot on a surface at different time points in an embodiment.
Figure 5B:
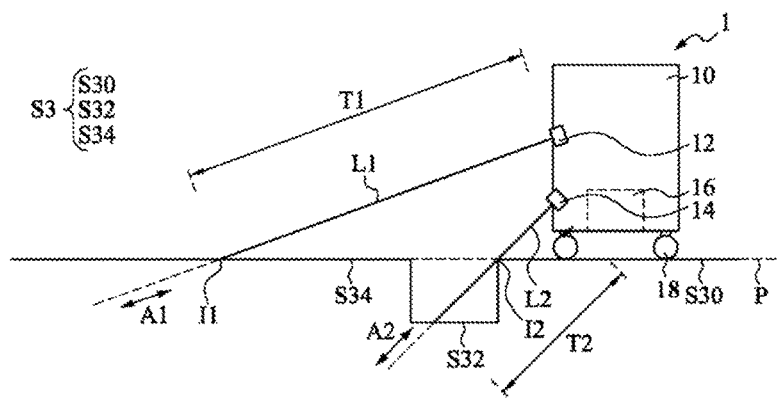

Please refer to FIG. 5A and FIG. 5B. FIG. 5A and FIG. 5B are side views of an autonomous mobile robot 1 on a surface S3 at different time points in an embodiment. The surface S3 includes surfaces S30, S32 and S34. The surfaces S30 and S34 locate at the moving datum plane P. The surface S32 is located between the surface S30 and the surface S34 and located at a side of the moving datum plane P relative to the autonomous mobile robot 1.

As shown in FIG. 5A, in the embodiment, the first distance sensor 12 and the second distance sensor 14 emit the first light L1 and the second light L2 toward the surface S3 along the first axial direction A1 and the second axial direction A2, respectively. When the first light L1 from the first distance sensor 12 reaches the surface S32, since the surface S32 is away from the intersection I1 between the moving datum plane P and the first axial direction A1, the first detecting distance T1 is within the first distance range D1. At the time, the control unit 16 controls the autonomous mobile robot 1 to move in the speed limited mode. That is, the control unit 16 reduces the movement speed of the autonomous mobile robot 1 from the first speed to the second speed, the autonomous mobile robot 1 keeps moving at the second speed for a time period. The first detecting distance T1 is continuously detected.

Then, the first distance sensor 12 continuously emits the first light L1 toward the surface S32 along the first axial direction A1. At the time point that the first light L1 reaches the surface S32, the first detecting distance T1 is within the first distance range D1. The control unit 16 resets the time counter and makes the autonomous mobile robot 1 keep moving at the second speed for another period time subsequent to the time point and to continuously detect the first detecting distance T1.

Then, when the first light L1 from the first distance sensor 12 leaves the surface S32 and reaches the surface S34, since the surface S34 locates at the moving datum plane P, the first detecting distance T1 is less than the lower limit of the first distance range D1. Therefore, after the first light L1 from the first distance sensor 12 leaves the surface S32, the control unit 16 controls the autonomous mobile robot 1 to move at the second speed for the another time period. The speed limited mode is stopped at the end of the another time period to control the autonomous mobile robot 1 to move at the first speed.

In FIG. 5B, before the end of the another time period, when the second light L2 from the second distance sensor 14 leaves the surface S30 to reach the surface S32, since the surface S32 is away from the second intersection I2 between the moving datum plane P and the second axial direction A2, the second detecting distance T2 is larger than the second pre-determined distance. Therefore, under the condition that the autonomous mobile robot 1 moves at the second speed, the control unit 16 controls the autonomous mobile robot 1 to stop moving.

In an embodiment, the surface S32 is far away from the moving datum plane P. When the first light L1 from the first distance sensor 12 reaches the surface S32, the first detecting distance T1 is within the second range D2 (the lower limit of the second range D2 is greater than the upper limit of the first distance range D1). Therefore, the control unit 16 decelerates the autonomous mobile robot 1 to stop moving. In an embodiment, the control unit 16 controls the autonomous mobile robot 1 to turn or retreat.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An autonomous mobile robot, adapted to move on a surface according to a moving datum plane, the autonomous mobile robot comprising:
   a first distance sensor configured to detect a first detecting distance between the first distance sensor and the surface along a first axial direction;
   a second distance sensor configured to detect a second detecting distance between the second distance sensor and the surface along a second axial direction, the first distance sensor has a first projection on the moving datum plane along the first axial direction, the second distance sensor has a second projection on the moving datum plane along the second axial direction, a distance between the first projection and the autonomous mobile robot is larger than the distance between the second projection and the autonomous mobile robot; and
   a control unit configured to control the autonomous mobile robot to move in a speed limited mode in response to the first detecting distance being within a first distance range that is greater than a safe distance range for which the speed of the mobile robot is not reduced, and configured to control the autonomous mobile robot to stop moving when the second detecting distance is larger than a second pre-determined distance.

2. The autonomous mobile robot according to claim 1, wherein the control unit is configured to reduce a movement speed of the autonomous mobile robot from a first speed to a second speed according to the speed limited mode.

3. The autonomous mobile robot according to claim 1, wherein the control unit is further configured to continuously detect the first detecting distance in a time period after the autonomous mobile robot moves in the speed limited mode, and the control unit is configured to stop the speed limited mode at the end of the time period when the first detecting distances in the time period are less than a lower limit of the first distance range.

4. The autonomous mobile robot according to claim 1, wherein the control unit is configured to continuously detect the first detecting distance in a time period after the autonomous mobile robot moves in the speed limited mode, and when the first detecting distance is within the first distance range at a time point of the time period, the control unit is configured to make the autonomous mobile robot keep moving in the speed limited mode.

5. The autonomous mobile robot according to claim 1, wherein the control unit is configured to control the autonomous mobile robot to stop moving when the first detecting distance is within a second range, and a lower limit of the second range is greater than an upper limit of the first distance range.

6. A mobile control method, adapted to an autonomous mobile robot that moves on a surface according to a moving datum plane, the mobile control method comprising:
obtaining a first detecting distance between a first position on the autonomous mobile robot and the surface along a first axial direction, the moving datum plane and the first axial direction have a first intersection;
obtaining a second detecting distance between a second position on the autonomous mobile robot and the surface along a second axial direction, the moving datum plane and the second axial direction have a second intersection, a distance between the first intersection and the autonomous mobile robot is larger than the distance between the second intersection and the autonomous mobile robot;
controlling the autonomous mobile robot to move in a speed limited mode in response to the first detecting distance being within a first distance range that is greater than a safe distance range for which the speed of the mobile robot is not reduced; and
controlling the autonomous mobile robot to stop moving when the second detecting distance is lamer than a second pre-determined distance.

7. The mobile control method according to claim 6, wherein the step of controlling the autonomous mobile robot to move in the speed limited mode when the first detecting distance is within the first distance range includes:
reducing a movement speed of the autonomous mobile robot from a first speed to a second speed.

8. The mobile control method according to claim 6, wherein the mobile control method further includes:
continuously detecting a difference between the first detecting distance and the first distance range in a time period that the autonomous mobile robot moves in the speed limited mode; and
stopping the speed limited mode when the first detecting distances in the time period are less than a lower limit of the first distance range.

9. The mobile control method according to claim 6, wherein the mobile control method further includes:
continuously detecting the first detecting distance in a time period while the autonomous mobile robot moves in the speed limited mode; and
making the autonomous mobile robot keep moving in the speed limited mode when the first detecting distance is within the first distance range at a time point in the time period.

10. The mobile control method according to claim 9, wherein the mobile control method further includes:
continuously detecting the first detecting distance in an another time period subsequent to the time point;
stopping the speed limited mode at the end of the another time period when the first detecting distances in the another time period are less than the first distance range; and
making the autonomous mobile robot keep moving in the speed limited mode when the first detecting distances is within the first distance range at an another time point in the another time period.

11. The mobile control method according to claim 6, wherein the mobile control method further includes:
controlling the autonomous mobile robot to stop moving when the first detecting distance is within a second range, a lower limit of the second range is greater than an upper limit of the first distance range.

* * * * *